(12) United States Patent
Sasu et al.

(10) Patent No.: US 11,425,050 B2
(45) Date of Patent: Aug. 23, 2022

(54) METHOD AND APPARATUS FOR CORRECTING A PACKET DELAY VARIATION

(71) Applicant: ADVA Optical Networking SE, Meiningen OT Dreissigacker (DE)

(72) Inventors: Silviu Adrian Sasu, Meiningen (DE); Achim Autenrieth, Meiningen (DE)

(73) Assignee: ADVA OPTICAL NETWORKING SE, Meiningen-Dreissigacker (DE)

( * ) Notice: Subject to any disclaimer, the term of this patent is extended or adjusted under 35 U.S.C. 154(b) by 0 days.

(21) Appl. No.: 17/157,407

(22) Filed: Jan. 25, 2021

(65) Prior Publication Data

US 2021/0243129 A1 Aug. 5, 2021

(30) Foreign Application Priority Data

Jan. 31, 2020 (EP) .................................... 20154988

(51) Int. Cl.
*H04L 12/801* (2013.01)
*H04L 47/2425* (2022.01)
(Continued)

(52) U.S. Cl.
CPC ........ *H04L 47/2433* (2013.01); *H04L 47/115* (2013.01); *H04L 47/283* (2013.01)

(58) Field of Classification Search
CPC ............... H04L 25/4906; H04L 47/115; H04L 47/2433; H04L 47/283; H04L 47/245
(Continued)

(56) References Cited

U.S. PATENT DOCUMENTS 5,557,608 A 9/1996 Calvignac et al.
6,631,399 B1 * 10/2003 Stanczak ............. H04L 12/1859
379/266.01
(Continued)

FOREIGN PATENT DOCUMENTS

EP 1 128 612 A2 8/2001

OTHER PUBLICATIONS

Csaba Simon, Design Aspects of Low-Latency Services with Time-Sensitive Networking, 2018, IEEE Xplore (Year: 2018).*
(Continued)

*Primary Examiner* — Robert J Lopata
(74) *Attorney, Agent, or Firm* — Jenkins, Wilson, Taylor & Hunt, P.A.

(57) ABSTRACT

A method and system of correcting a packet delay variation, PDV, of express traffic comprising high-priority express packets interspersed at a transmitter (2) by a preemption mechanism with a best-effort traffic comprising low-priority best-effort packets, wherein the method comprises the steps of: calculating (S1) at the transmitter (2) a preemption delay value, PRDV, which indicates a preemption delay, PD, introduced by the preemption mechanism; writing (S2) the calculated preemption delay value, PRDV, into a delay header field of a header of a high-priority express packet transmitted by said transmitter (2) via a signal line (4) to a receiver (3); extracting (S3) the preemption delay value, PRDV, from the delay header field of the header of the high-priority express packet received by the receiver (3) via the signal line (4) from the transmitter (2); calculating (S4) at the receiver (3) a variation compensation delay, VCD, value by subtracting the extracted preemption delay value, PRDV, from a predetermined worst-case preemption delay value, $PRDV_{worst}$; and applying (S5) at the receiver an additional delay to the high-priority express packet accord-
(Continued)

ing to the calculated variation compensation delay, VCD, value to compensate the preemption delay, PD, introduced by the preemption mechanism at the transmitter (2).

18 Claims, 11 Drawing Sheets

(51) Int. Cl.
  *H04L 47/11* (2022.01)
  *H04L 47/283* (2022.01)
(58) Field of Classification Search
  USPC .......................................................... 370/235
  See application file for complete search history.

(56) References Cited

U.S. PATENT DOCUMENTS

| 2015/0124610 | A1* | 5/2015 | Barrass | H04L 47/12 |
| | | | | 370/235 |
| 2017/0244648 | A1* | 8/2017 | Tse | H04L 47/28 |
| 2019/0166061 | A1* | 5/2019 | Farkas | H04L 47/621 |

OTHER PUBLICATIONS

R. Veisllari, Minimizing Delay and Packet Delay Variation in Switched 5G Transport Networks, 2019, IEEE Xplore (Year: 2019).*
Wan et al., "A performance Study of CPRI over Ethernet with IEEE 802.1Qbu and 802.1Qbv Enhancements," IEEE Global Communications Conference, pp. 1-6, (2015).
Jia et al., "Performance Evaluation of IEEE 802.1Qbu: Experimental and Simulation Results," 38th Annual IEEE Conference on Local Computer Networks, pp. 659-662, (2013).
Extended European Search Report for European Patent Application Serial No. 20154988.8 (dated May 27, 2020).
Bjørnstad, S. et al., "Minimizing Delay and Packet Delay Variation in Switched 5G Transport Networks," Journal of Optical Communications and Networking, vol. 11, No. 4, pp. B49-B59, (Apr. 1, 2019).
Simon, C. et al., "Design Aspects of Low-Latency Services With Time-Sensitive Networking," IEEE Communications Standards, vol. 2, No. 2, pp. 48-54 (Jun. 1, 2018).

* cited by examiner

Dynamic Delay - module description

METHOD AND APPARATUS FOR CORRECTING A PACKET DELAY VARIATION

PRIORITY CLAIM

This application claims the priority benefit of European Patent Application Number 20154988.8, filed Jan. 31, 2020, the disclosure of which is incorporated herein by reference in its entirety.

TECHNICAL FIELD

The invention relates to a method and apparatus for correcting a packet delay variation of express traffic comprising high-priority express packets interspersed at a transmitter by a preemption mechanism with a best-effort traffic comprising low-priority best-effort packets. This disclosure also relates to encapsulation to support packet delay variation correction for express traffic (express ethernet frames).

TECHNICAL BACKGROUND

The increasing demand of Internet traffic on mobile communication networks and growing requirements of emerging 5G use cases such as augmented reality and mission-critical communication have raised lower latency and timing accuracy as a catalyst for 5G networks. Time-sensitive networking (TSN) display a role in enabling a packet-switched mobile fronthaul. The fronthaul infrastructure is currently provided by Common Public Radio Interface (CPRI) industry standard which uses dedicated optical links. An alternative is to use Ethernet as a ubiquitous technology aiming to reduce existing network equipment. However, in contrast to a conventional synchronous fronthaul, Ethernet may suffer from packet delay variation PDV and lacks synchronization recovery capabilities. Since the delay and delay variation is a critical quality of service QoS factor, frame scheduling over an Ethernet link often becomes a primary challenge to meet each endpoints delay requirements. Conventional packet-switched networks such as conventional Ethernet networks do not support preemptive priority frame forwarding mechanisms. The reason for this is that once a frame has been transmitted it cannot be stopped in such a baseband communication link. Two recent enhancements, namely IEEE 802.1Qbu and IEEE 802.1Qbv have been proposed for Ethernet to carry time-sensitive traffic. Frame preemption allows a frame with lower priority to be preempted by another frame with higher priority. Such a preemption mechanism causes packet delay variation PDV.

Accordingly, there is need to provide a method and apparatus which is used for correcting packet delay variation introduced by a preemption mechanism.

SUMMARY OF THE INVENTION

The invention provides according to the first aspect of the present invention a method of correcting a packet delay variation, PADV, of express traffic comprising high-priority express packets interspersed at a transmitter by a preemption mechanism with a best-effort traffic comprising low-priority best-effort packets, wherein the method comprises the steps of:

calculating at the transmitter a preemption delay value, PRDV, which indicates a preemption delay, PD, introduced by a preemption mechanism, writing the calculated preemption delay value, PRDV, into a delay header field of a header of a high-priority express packet transmitted by said transmitter via a signal line to a receiver, extracting the preemption delay value, PRDV, from the delay header field of the header of the high-priority express packet received by the receiver via the signal line from the transmitter, calculating at the receiver a variation compensation delay, VCD, value by subtracting the extracted preemption delay value, PRDV, from a predetermined worst-case preemption delay value, $PRDV_{worst}$, and applying at the receiver an additional delay to the high-priority express packet according to the calculated variation compensation delay, VCD, value to compensate the preemption delay, PD, introduced by the preemption mechanism at the transmitter.

The method according to the present invention eliminates the packet delay variation, PDV, introduced by implementing preemption mechanisms as described in IEEE 802.1Qbu and IEEE 802.3br standards for Ethernet MAC implementations. The method provides a minimal extension to 802.1Qbu and 802.3br standards since the proposed method can reuse the same frame format extension as preemption header and provides a minimal impact on the overall transmission system.

The method further provides the advantage that it does avoid low-priority traffic starvation, when gaps between high-priority express packets are smaller than every low-priority best-effort packet waiting to be transferred. Low-priority traffic starvation leads to a huge throughput-loss, when the gaps between high-priority express packets cannot be filled.

This can happen when the gaps between high-priority packets are smaller than every low-priority best-effort packet waiting to be transferred.

The method can support a configurable priority mechanism or preemption mechanism (such as Round Robin or Strict) for best-effort traffic aggregation.

In a possible embodiment of the method according to the first aspect of the present invention, the preemption mechanism at the transmitter interrupts the transmission of low-priority best-effort packets in response to a preemption request if a high-priority express packet is provided by an express traffic source to preempt the low-priority best-effort packets by the high-priority express packet.

In a further possible embodiment of the method according to the first aspect of the present invention, the preemption of a low-priority best-effort packet by the high-priority express packet is only performed in the preemption mechanism if at least a predefined first number of bytes of the preemptable best-effort packet have been transmitted and at least a predetermined second number of bytes of the preemptable best-effort packet remains to be transmitted and/or a total frame size of the preemptable best-effort packet is less than the sum of the first and second number of bytes.

In a possible embodiment of the method according to the first aspect of the present invention, the first number of bytes comprises 60 bytes and the second number of bytes comprises 64 bytes and the sum of the first and second number of bytes comprises 124 bytes.

In a further possible embodiment of the method according to the first aspect of the present invention, if no preemption can be performed the high-priority express packets are buffered in a first in—first out, FIFO, buffer unit of the transmitter before being interspersed by the preemption mechanism with low-priority best-effort packets.

In a further possible embodiment of the method according to the first aspect of the present invention, the size of the first in—first out, FIFO, buffer unit of the transmitter corresponds to the worst-case preemption delay.

In a still further possible embodiment of the method according to the first aspect of the present invention, the predetermined worst-case preemption delay includes a mandatory interframe gap, IFG, a preamble and a delimiter.

In a still further possible embodiment of the method according to the first aspect of the present invention, the predetermined worst-case preemption delay comprises 142 bytes.

In a further possible embodiment of the method according to the first aspect of the present invention, the high-priority express packets and the low-priority best-effort packets are marked accordingly at the transmitter.

In a further possible embodiment of the method according to the first aspect of the present invention, the packets received by the receiver from the transmitter via the signal line are split by the receiver according to their marking into high-priority express packets and into low-priority best-effort packets before extracting the preemption delay value, PRDV, from the delay header field of the header of the high-priority express packet.

In a further possible embodiment of the method according to the first aspect of the present invention, the preemption mechanism comprises an IEEE 802.Qbu preemption mechanism or an IEEE 802.3br preemption mechanism.

In a further possible embodiment of the method according to the first aspect of the present invention, the high-priority express packets comprise time-sensitive packets including packets carrying voice data, video data, alarm data and/or failure indications.

The invention provides according to the second aspect a transmitter for transmitting traffic which includes express traffic comprising high-priority express packets interspersed at the transmitter by a preemption mechanism with a best-effort traffic comprising low-priority best-effort packets, said transmitter comprising:

a processing unit adapted to calculate a preemption delay value, PRDV, which indicates a preemption delay, PD, introduced by the preemption mechanism, and an insertion unit adapted to insert the calculated preemption delay value, PRDV, into a delay header field of a header of a high-priority packet transmitted by the transmitter via a signal line to a receiver.

In a possible embodiment of the transmitter according to the second aspect of the present invention, the transmitter further comprises a first in—first out, FIFO, buffer unit, adapted to buffer high-priority express packets before being interspersed by the preemption mechanism of the transmitter.

The invention provides according to the third aspect a receiver for receiving traffic which includes express traffic comprising high-priority express packets interspersed at a transmitter by a preemption mechanism with best-effort traffic comprising low-priority best-effort packets, said receiver comprising:

an extraction unit, adapted to extract a preemption delay value, PRDV, from a delay header field of a header of a high-priority express packet received by the receiver via a signal line from the transmitter, a processing unit, adapted to calculate a variation compensation delay, VCD, value by subtracting the extracted preemption delay value, PRDV, from a predetermined worst-case preemption delay value $PRDV_{worst}$, and a dynamic delay unit, adapted to apply an additional delay to the high-priority express packet according to the calculated variation compensation delay, VCD, value to compensate the preemption delay, PD, introduced by the preemption mechanism at the transmitter.

In a possible embodiment of the receiver according to the third aspect of the present invention, the dynamic delay unit of the receiver comprises serial connected delay registers having outputs connected with inputs of a multiplexer receiving as a selection control signal the variation compensation delay, VCD, value calculated by the processing unit of the receiver.

In a possible embodiment of the receiver according to the third aspect of the present invention, the receiver further comprises a splitting unit, adapted to split packets received via the signal line from the transmitter according to their marking into high-priority express packets and into low-priority best-effort packets before extracting the preemption delay value, PRDV, from the delay header field of the header of the high-priority express packet by the extraction unit of the receiver.

The invention provides according to a fourth aspect a transmission system comprising at least one transmitter according to the second aspect of the present invention and at least one receiver according to the third aspect of the present invention, wherein the transmitter and the receiver are connected to each other via a signal line of the transmission system.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
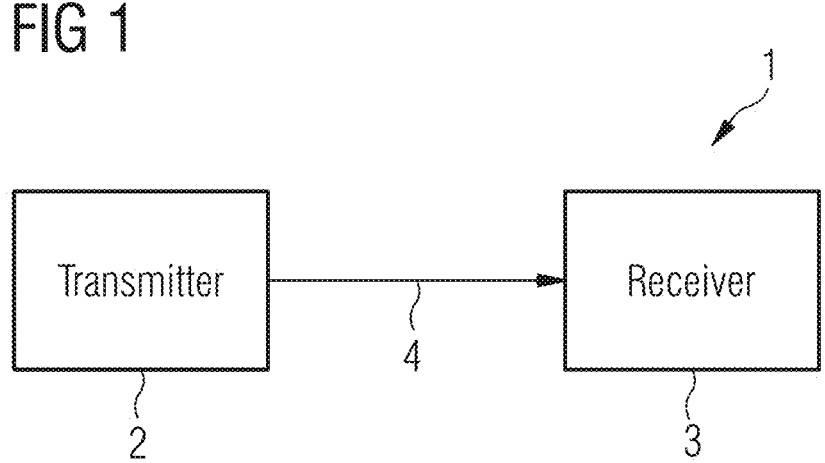
FIG. 1 shows a schematic block diagram for illustrating a possible exemplary embodiment of a transmission system according to an aspect of the present invention.

As can be seen in the schematic block diagram illustrated in FIG. 1, a transmission system 1 according to the present invention comprises at least one transmitter 2 and at least one receiver 3 which are connected to each other via a signal line 4 of the transmission system 1.

Figure 2:
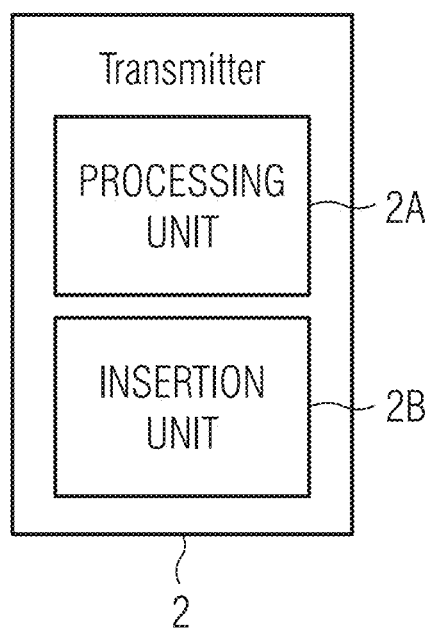
FIG. 2 shows a schematic block diagram of a transmitter according to a further aspect of the present invention.

A possible embodiment of the transmitter 2 shown in FIG. 1 is illustrated in the block diagram of FIG. 2. The transmitter 2 is adapted for transmitting traffic which includes express traffic comprising high-priority express packets interspersed within the transmitter 2 by a preemption mechanism with a best-effort traffic comprising low-priority best-effort packets. As illustrated in FIG. 2, the transmitter 2 comprises a processing unit 2A adapted to calculate a preemption delay value PRDV which indicates a preemption delay PD introduced by the preemption mechanism. The transmitter 2 further comprises an insertion unit 2B adapted to insert the calculated preemption delay value PRDV into a delay header field of a header of a high-priority express packet transmitted by the transmitter 2 via the signal line 4 to a receiver 3.

Figure 3:
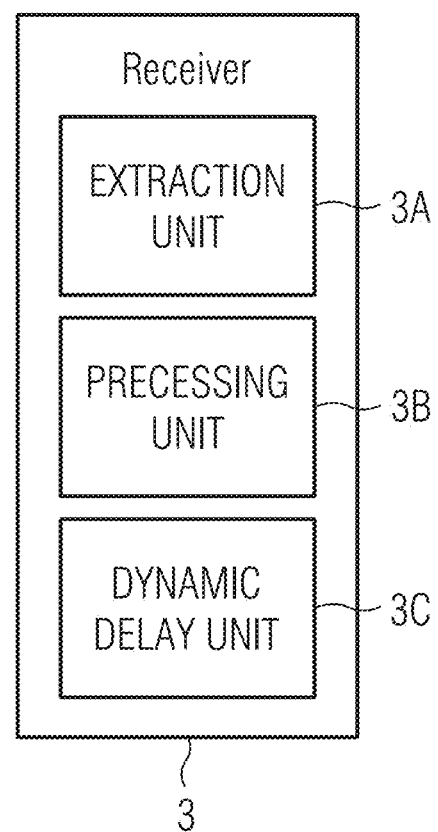
FIG. 3 shows a schematic block diagram of a receiver according to a further aspect of the present invention.

FIG. 3 shows a block diagram of a receiver 3 of the transmission system 1 shown in FIG. 1. In the illustrated exemplary embodiment, the receiver 3 is adapted to receive traffic which includes express traffic comprising high-priority express packets interspersed at the transmitter 2 by the preemption mechanism with best-effort traffic comprising low-priority best-effort packets. In the illustrated embodiment, the receiver 3 comprises an extraction unit 3A, a processing unit 3B and a dynamic delay unit 3C. The extraction unit 3A is adapted to extract a preemption delay value PRDV from a delay header field of a header of a high-priority express packet received by the receiver 3 via the signal line 4 from the transmitter 2. The receiver 3 further comprises a processing unit 3B adapted to calculate a variation compensation delay VCD value by subtracting the extracted preemption delay value PRDV from a predetermined worst-case preemption delay value $PRDV_{worst}$. The receiver 3 further comprises a dynamic delay unit 3C adapted to apply an additional delay to the high-priority express packet according to the calculated variation compensation delay VCD value to compensate the preemption delay PD introduced by the preemption mechanism at the transmitter 2.

In a possible embodiment, the dynamic delay unit 3C of the receiver 3 can comprise serial connected delay registers having outputs connected with inputs of a multiplexer receiving as a selection control signal the variation compensation delay VCD value calculated by the processing unit 3B of the receiver 3. In a possible embodiment, the receiver 3 can also comprise a splitting unit (not shown in FIG. 3) adapted to split packets received via the signal line 4 from the transmitter 2 according to their marking into high-priority express packets and into low-priority best-effort packets before extracting the preemption delay value PRDV from the delay header field of the header of the high-priority express packet by the extraction unit 3A of the receiver 3.

Figure 4:
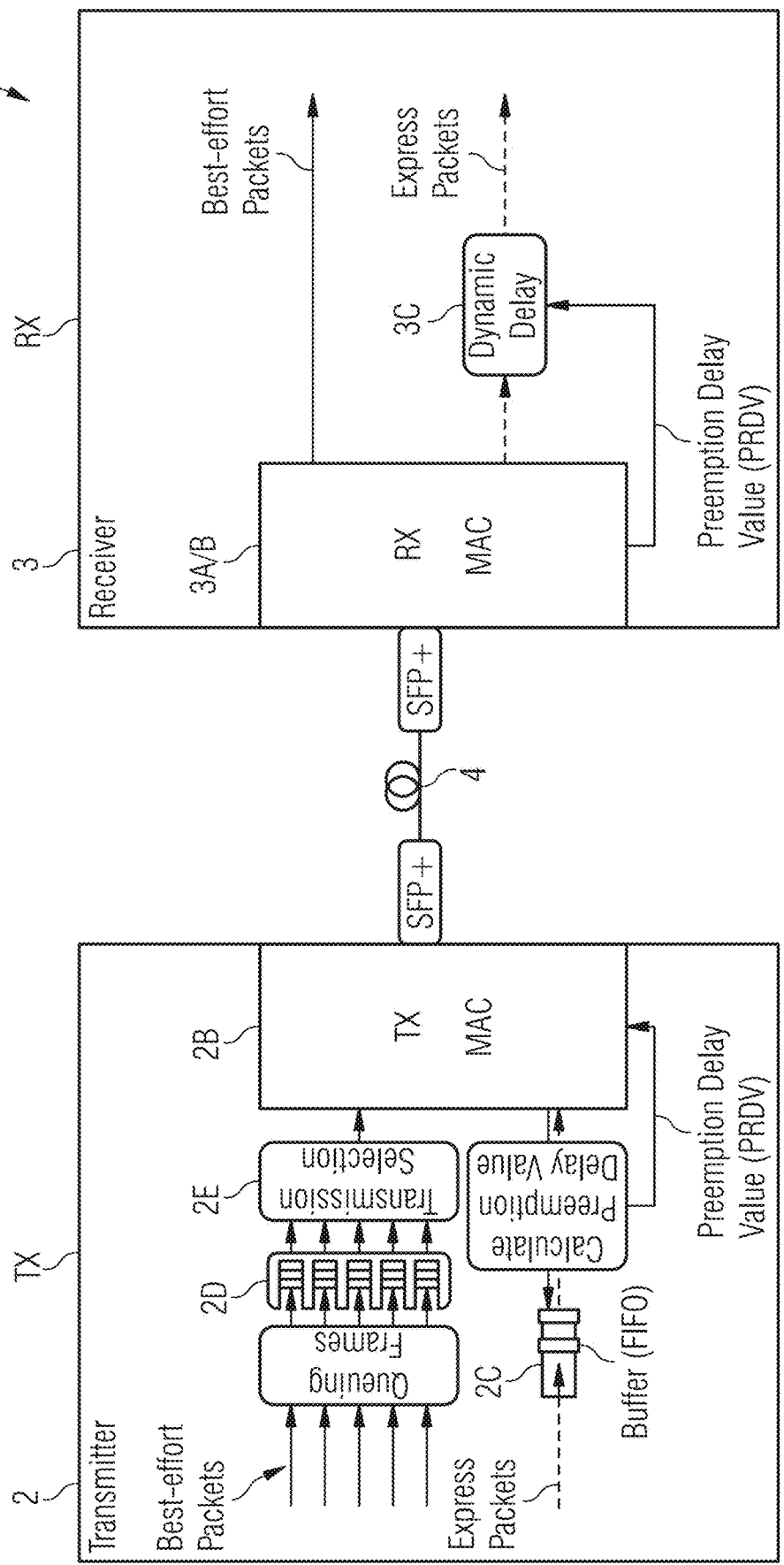
FIG. 4 shows a system overview of a possible exemplary embodiment of a transmission system according to an aspect of the present invention.

FIG. 4 shows a more detailed block diagram of a possible exemplary embodiment of a transmission system 1 according to an aspect of the present invention. In the illustrated embodiment of FIG. 4, the transmitter 2 and the receiver 3 can be implemented by using digital design techniques like FPGA and/or ASIC. By using these digital design techniques, the transmission system 1 according to the present invention can reduce the packet delay variation PDV introduced by a preemption mechanism at the transmitter 2 to logical zero. This can be achieved in a possible embodiment by defining a preemption delay header byte to configure an on-the-fly configurable dynamic delay unit module 2C at the receiver 3. In the IEEE 802.1 standardization group, time-sensitive networking (TSN) mechanisms for minimizing delay and for controlling the packet delay variation PDV are standardized. The IEEE 802.1Qbu and IEEE 802.3br define a preemption mechanism enabling a minimized delay on deterministic (express) traffic when mixed with best-effort (preemptable) traffic within the same Ethernet ports. By interrupting the transmission of low-priority best-effort packets when a deterministic high-priority express packet arrives, worst-case packet delay is minimized. Some packet delay variation PDV occurs on express packets because preemption is only performed if at least a predefined first number of e.g. 60 bytes of the preemptable frame have been transmitted and at least a second number of e.g. 64 bytes (including the frame CRC) remain to be transmitted. By adding a mandatory interframe gap IFG, preamble and delimiter, this results in a preemption delay PD. The preemption delay PD comprises in a worst-case scenario a predefined number of bytes and in a best-case scenario a zero delay. In a possible embodiment for implementation in a worst-case scenario, the preemption delay PD comprises 142 bytes. Accordingly, a preemption delay variation PRDV of up to 142 bytes transmission time can be caused.

As illustrated in FIG. 4, the transmitter 2 is provided to transmit low-priority best-effort packets and high-priority express packets. The transmitter 2 illustrated in FIGS. 2, 4 comprises a processing unit 2A adapted to calculate a preemption delay value PRDV which indicates a preemption delay PD introduced by the preemption mechanism. This calculated preemption delay value PRDV is supplied to an insertion unit 2B. The insertion unit 2B is adapted to insert the calculated preemption delay value PRDV into a delay header field of a header of a high-priority express packet transmitted by the transmitter 2 via the signal line 4 to the receiver 3 as shown in FIG. 4. In the illustrated embodiment of FIG. 4, the transmitter 2 further comprises a first in—first out, FIFO, buffer unit 2C adapted to buffer high-priority express packets before being interspersed by the preemption mechanism of the transmitter 2. The high-priority express packets illustrated in FIG. 4 can comprise different kinds of high-priority express packets including time-sensitive packets such as packets carrying voice data, video data, alarm data and/or failure indications. FIG. 4 illustrates a one-way data path of a possible exemplary hardware implementation. The transmitter 2 can receive low-priority effort packets from at least one best-effort packet data source. In a possible implementation, the transmitter 2 can aggregate a fronthaul traffic from different remote radio heads RRH. Arriving best-effort packets are stored temporarily in queues 2D supplied to a transmission selection unit 2E. At the transmitter 2, the preemption delay value PRDV is calculated by the processing unit 2A which indicates the preemption delay PD introduced by the preemption mechanism. The calculated preemption delay value PRDV is inserted automatically into a delay header field of a header of a high-priority express packet received from the first in—first out, FIFO, buffer unit 2C and transmitted by the transmitter 2 via the signal line 4 to the receiver 3. The preemption mechanism can be implemented in the preemption unit 2B of the transmitter 2. The preemption mechanism at the transmitter 2 is adapted to interrupt the transmission of the low-priority best-effort packets stored temporarily in the queues 2D in response to a preemption request if a high-priority express packet arrives from an express traffic source to preempt the low-priority best-effort packets by a high-priority express packet read from the FIFO buffer unit 2C. In a possible embodiment, the preemption of a low-priority best-effort packet by the high-priority express packet is only performed in the preemption mechanism if at least a predefined first number of e.g. 60 bytes of the preemptable best-effort packet have been transmitted and at least a predefined second number of e.g. 64 bytes of the preemptable best-effort packet remains to be transmitted and/or a total frame size of the preemptable best-effort packet is less than the sum of the first number of bytes and the second number of bytes, i.e. less than 124 bytes.

If no preemption can be performed, the high-priority express packets are buffered in the first in—first out, FIFO, buffer unit 2C of the transmitter 2 before being interspersed by the preemption mechanism of the preemption unit 2B with the queued low-priority best-effort packets.

The size of the first in—first out, FIFO, buffer unit 2C of the transmitter 2 corresponds to the worst-case preemption delay PD. The predetermined worst-case preemption delay PD includes a mandatory interframe gap IFG and a preamble as well as a delimiter. In a possible embodiment, the predetermined worst-case preemption delay PD comprises 142 bytes.

The high-priority express packets and the low-priority best-effort packets can be marked accordingly at the transmitter side. The packets are transported via the signal line 4 to the receiver 3. The packets received by the receiver 3 from the transmitter 2 via the signal line 4 are first split by the receiver 3 according to the marking into high-priority express packets and into low-priority best-effort packets before extracting the preemption delay value PRDV from the delay header field of the header of the received high-priority express packet.

In a possible embodiment, the preemption mechanism performed by the preemption unit 2B of the transmitter 2 comprises an IEEE 802.1Qbu preemption mechanism or an IEEE 802.3br preemption mechanism. The time-sensitive preemption can be utilized to guarantee latency and PDV requirements, e.g. for an Ethernet fronthaul. The time-sensitive network implementation using IEEE802.1Qbu frame preemption requires that all transmitters 2 and receivers 3 can support and enable IEEE802.1Qbu capability. The receiver 3 can extract and identify high-priority express packets on input queues while the transmitter 2 in order to ensure preferential treatment of the traffic frames or traffic packets accordingly and does preempt low-priority best-effort traffic by high-priority express traffic. A transmission time packet delay variation of up to 142 bytes caused by a frame or a packet preemption can be reduced to zero by defining and transmitting a preemption delay delimiter header field for each express packet to the receiver 3 as a parameter for the on-the-fly configurable dynamic delay unit 3C also illustrated in FIG. 5.

When preemption cannot be performed, the worst-case delay of 142 bytes cannot deterministically affect a sequence of express packets. In order to avoid this negative effect, the first in—first out, FIFO, buffer 2C with a size of at least 142 bytes (i.e. worst-case preemption delay size) is provided. The first in—first out buffer 2C is adapted to absorb a worst-case packet delay PD. The processing unit 2A is adapted to calculate the preemption delay value PRDV used to keep track of the packet delay PD introduced packet by packet. In this way, whenever preemption cannot be performed, the delayed bytes are buffered in the FIFO buffer unit 2C. Consequently, no backpressure can be exerted on the following express packets. The calculated preemption delay value PRDV can be inserted in a possible embodiment by the TX Ethernet MAC in a PD delimiter header field and then extracted on the receiver side and forwarded to the dynamic delay unit 3C as illustrated schematically in FIGS. 4, 5.

The dynamic delay unit 3C can then eliminate the preemption delay by additionally delaying express packets with a variable compensation delay value VCD which can be expressed for each express packet as follows: VCD=Worst-case preemption delay value−preemption delay value PRDV.

Accordingly, in a possible implementation, the variable compensation delay value VCD is calculated for each express packet as follows: VCD=142 (maximum preemption delay)−preemption delay value PRDV.

As illustrated in FIG. 4, the processing unit 3B is adapted to calculate the variation compensation delay VCD value by subtracting the extracted preemption delay value PRDV from a predetermined worst-case preemption delay value of e.g. 142 bytes. The calculation of the variation compensation delay value VCD can either take place by a processing unit 3B integrated in the extraction unit 3A, by a processing unit 3B integrated in the dynamic delay unit 3C or by a separate processing unit 3B. In the illustrated embodiment of FIG. 5, the extraction unit 3A forwards the extracted preemption delay value PRDV to a processing unit 3B connected to the dynamic delay module 3C.

Figure 5:
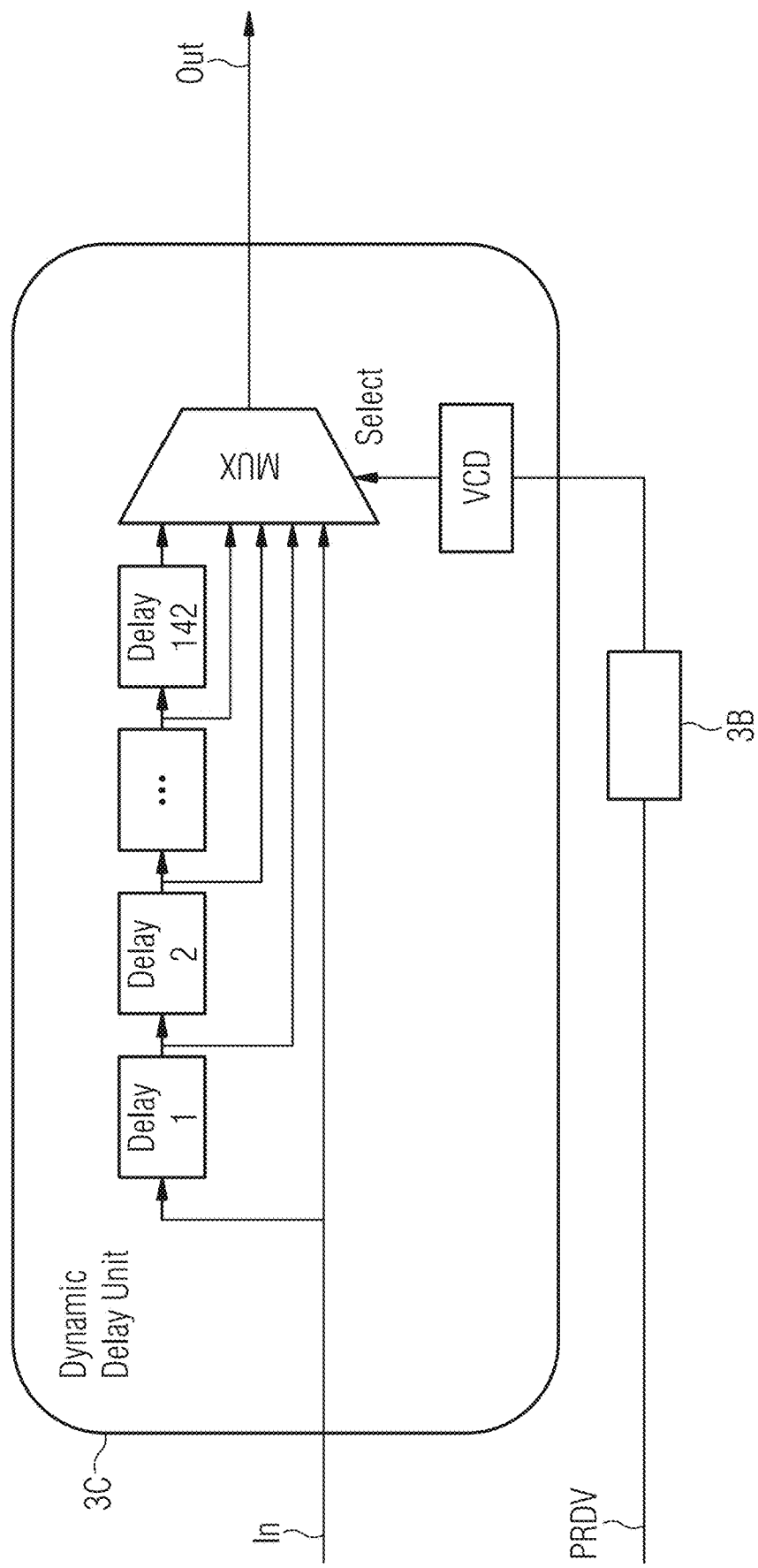
FIG. 5 shows a circuit diagram for illustrating a possible exemplary embodiment of a dynamic delay unit within a receiver according to an aspect of the present invention.

FIG. 5 shows a possible exemplary embodiment of a dynamic delay unit 3C adapted to apply an additional delay to the high-priority express packet received at an input terminal of the dynamic delay unit 3C according to the calculated variation compensation delay VCD value to compensate the preemption delay PD introduced by the preemption mechanism at the transmitter 2. In the illustrated embodiment of FIG. 5, the dynamic delay unit 3C of the receiver 3 comprises serial connected delay registers having outputs connected with inputs of a multiplexer MUX receiving as a selection control signal the variation compensation delay VCD value calculated by the processing unit 3B.

The dynamic delay unit 3C does eliminate the packet delay variation PDV introduced by the preemption mechanism.

The multiplexer MUX comprises inputs connected to all flip-flops/registers (delay 0 to 142) and provides the possibility to generate a dynamically parametrizable delay based on the preemption delay value PRDV. The variation compensation delay VCD value is used for the multiplexer MUX input selection in order to additionally delay the received express packet to compensate the preemption PDV. The variation compensation delay VCD value is calculated by subtracting the preemption delay value PRDV from the maximum worst-case delay caused by preemption.

Figure 6:
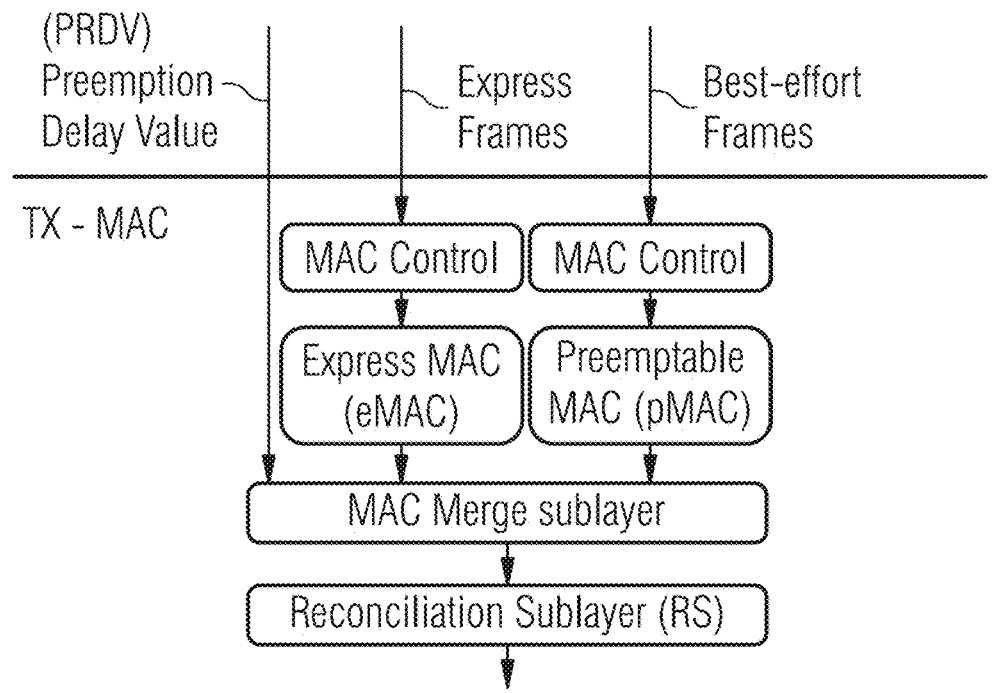
FIG. 6 shows a more detailed block diagram of a possible exemplary embodiment of a transmitter according to an aspect of the present invention.

Since the IEEE 802.1Qbu and IEEE 802.3br mechanism do directly affect, i.e. delay, the express packet when preemption does occur, it is possible to determine the preemption delay value PRDV on the transmitter side even right before the express packet transmission starts after the MAC merge sublayer. The preemption delay value PRDV (in bytes) can be transmitted to the receiver side, e.g. as a 1-byte header field, at the beginning of a high-priority express packet. Consequently, the dynamic delay unit 3C can be parametrized in time, right before the high-priority express packet does arrive. Therefore, in a possible embodiment, the transmitter 2 and the receiver 3 can be implemented as illustrated in FIGS. 6, 7 which give a more detailed overview of the modified transceiver and respectively receiver MAC IEEE 802.1Qbu and IEEE 802.3br implementations also illustrated in FIG. 4.

When preemption cannot be performed at the transmitter side, a worst-case delay of e.g. 142 bytes can be non-deterministic propagated over a sequence of express packets. This means that a sequence of express packets with gaps smaller than 142 bytes can be non-deterministically delayed. In order to avoid this effect, the FIFO buffer 2C of 142 bytes (worst-case preemption delay) is provided at the transmitter side for express packets. The FIFO buffer unit 2C does absorb the worst-case delay and does help keep track of the introduced delay packet by packet. This way, whenever preemption cannot be performed, the delayed bytes are buffered so that no back-pressure is exerted against the eventually next express packets.

Also, on the transmitter side, the processing unit 2A can be used to calculate the preemption delay value PRDV. The calculated preemption delay value PRDV is supplied to the insertion unit which is adapted to write the calculated preemption delay value PRDV into a delay header field of a header of a high-priority express packet transmitted by the transmitter 2 via the signal line 4 to the receiver 3. The delimiter header carries the value in bytes of the delay introduced by the preemption mechanism. So, whenever an express packet is delayed, the backpressure delay in bytes exerted towards the buffer is determined and the preemption delay value PRDV is sent to the MAC merge sublayer block of the transmitter, where the value is inserted.

Figure 7:
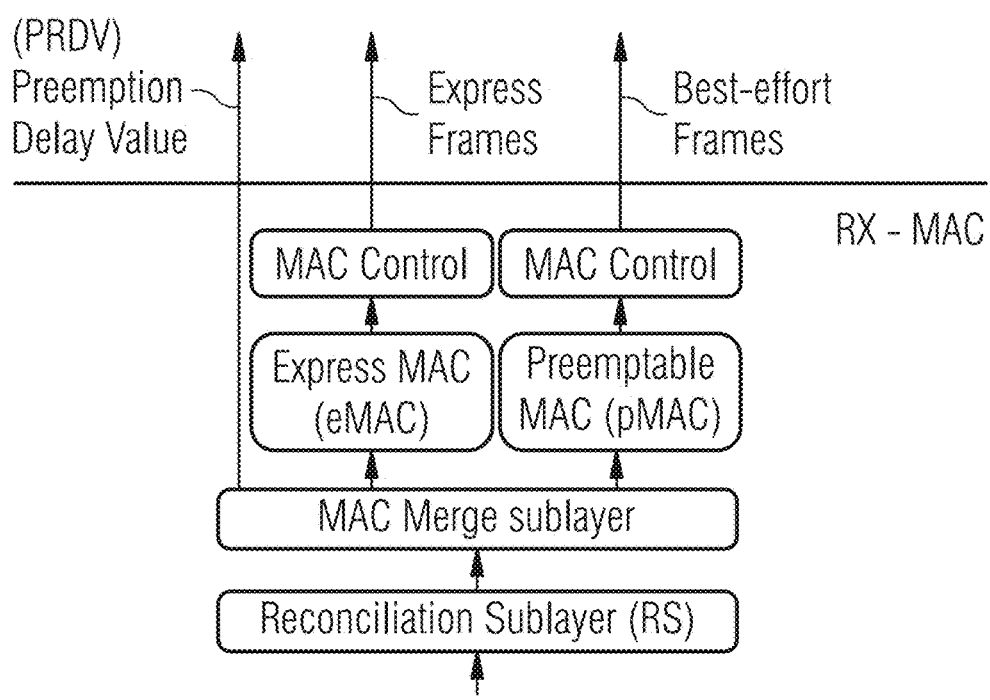
FIG. 7 shows a more detailed block diagram of a possible exemplary embodiment of a receiver according to an aspect of the present invention.

On the receiver side as illustrated in FIG. 7, the extraction unit 3A is adapted to extract the preemption delay value PRDV from the delay header field of the header of the received high-priority express packet. The extracted value is forwarded to the dynamic delay unit 3C as shown in FIG. 7.

Figure 8:
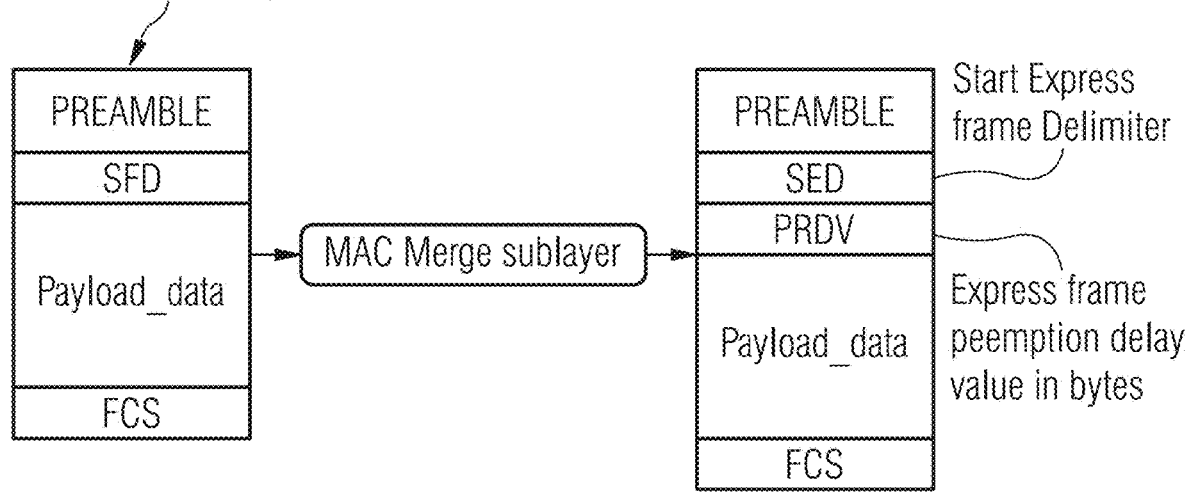
FIG. 8 shows a diagram for illustrating the insertion of a calculated preemption delay value into a delay header field of a header to illustrate the operation of the system according to the present invention.

FIG. 8 shows an exemplary data structure which can be used by the method according to the present invention. In a possible embodiment, on the transmitter side, a 1-byte delay header can be inserted right after the Ethernet preamble and delimiter at the beginning of a high-priority express packet such as an Express Ethernet Frame.

In a possible implementation, to avoid any throughput-loss, it is possible to shorten the express packet preamble by 1 byte (e.g. from 7 bytes to 6 bytes). This approach is technically feasible and can be as well standardized since there is already a similar approach for fragmented preempted packets described in IEEE 802.1Qbu and IEEE 802.3br standards.

Figure 9:
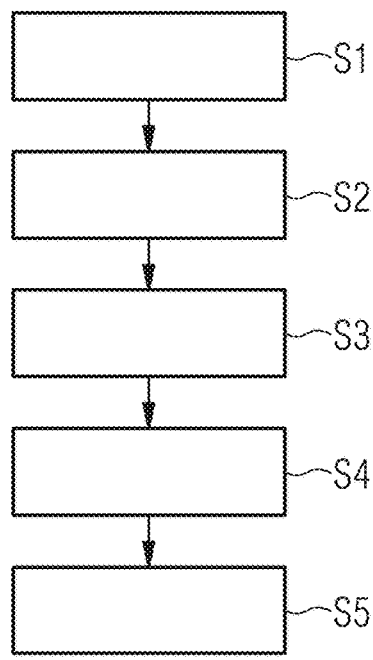
FIG. 9 shows a flowchart for illustrating a possible exemplary embodiment of a method according to the first aspect of the present invention.

FIG. 9 shows a flowchart of a possible exemplary embodiment of a method for correcting a packet delay variation PDV of express traffic comprising high-priority express packets interspersed at a transmitter 2 by a preemption mechanism with a best-effort traffic comprising low-priority best-effort packets according to an aspect of the present invention. In the illustrated embodiment of the method, the method comprises five main steps.

In a first step S1, a preemption delay value PRDV is calculated at the transmitter 2 wherein the calculated preemption delay value PRDV indicates a preemption delay PD introduced at the transmitter side by a preemption mechanism.

In a further step S2, the calculated preemption delay value PRDV is inserted into a delay header field of a header of a high-priority express packet transmitted by the transmitter 2 via a signal line 4 to a receiver 3 as also illustrated in FIG. 8.

In a further step S3, the preemption delay value PRDV is extracted from the delay header field of the header of a high-priority express packet received by the receiver 3 via the signal line 4 from the transmitter 2.

In a further step S4, a variation compensation delay value VCD is calculated at the receiver 3 by subtracting the extracted preemption delay value PRDV from a predetermined worst-case preemption delay value $PRDV_{worst}$.

In a final step S5, at the receiver 3, an additional delay is applied to the high-priority express packet according to the calculated variation compensation delay VCD value to compensate automatically the preemption delay PD introduced by the preemption mechanism at the transmitter side.

Figure 10:
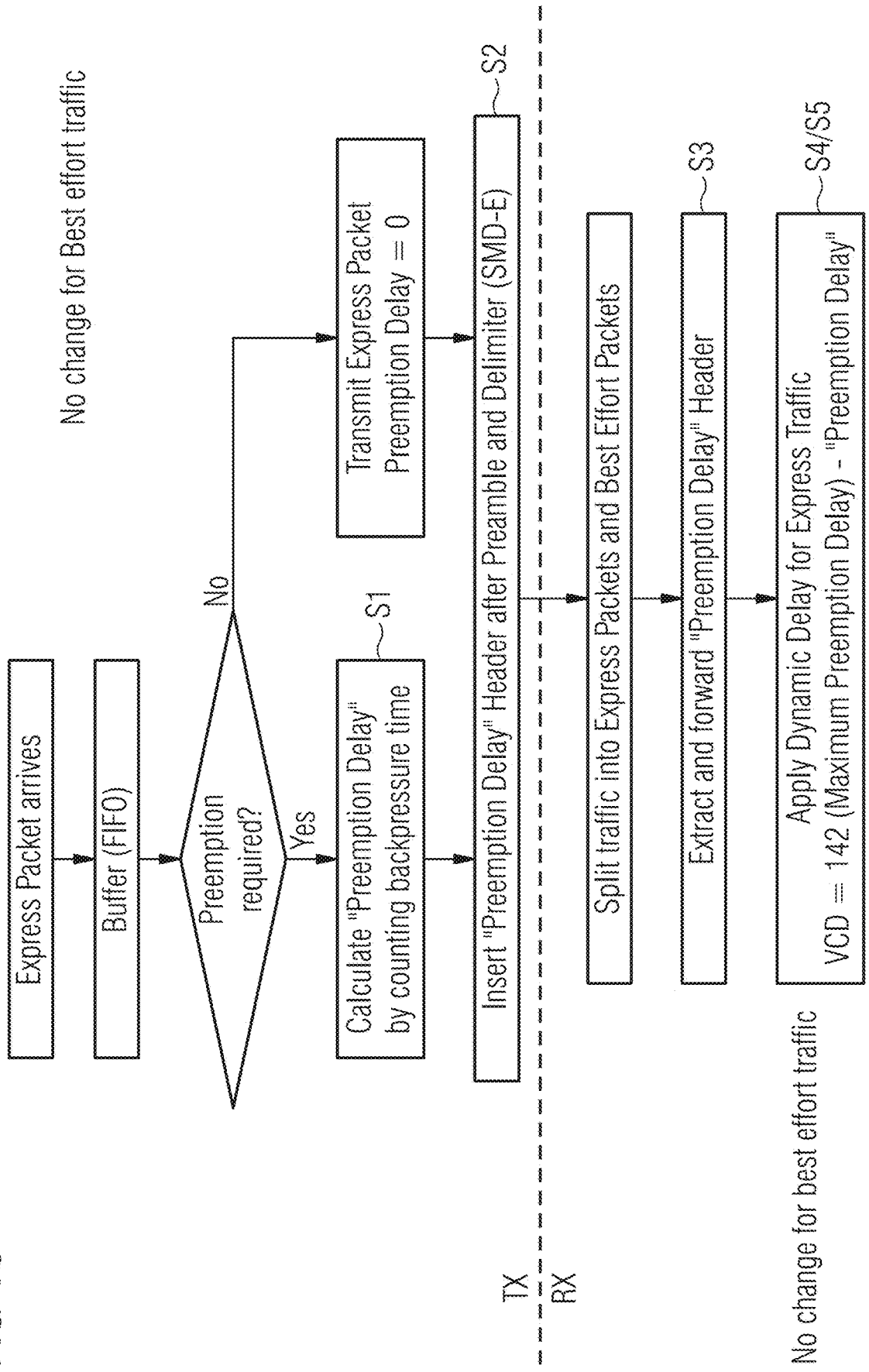
FIG. 10 shows a further flowchart for illustrating a possible exemplary embodiment of a method according to the first aspect of the present invention.

FIG. 10 shows a flowchart of a possible embodiment of a method according to the present invention. FIG. 10 shows an overall workflow of a proposed mechanism for interspersed express traffic. FIG. 10 illustrates steps performed on the transmitter side TX and on the receiver side RX. On both sides, no change for best-effort traffic occurs. In the illustrated implementation of FIG. 10, when a high-priority express packet arrives, it is first buffered in a first in—first out, FIFO, buffer unit 2C of the transmitter 2. Then, it is checked whether a preemption is required or not. In case that a preemption is required, the preemption delay value PRDV can be calculated in step S1, e.g. by counting backpressure time. In case that no preemption is required, the high-priority express packet is transmitted by the transmitter 2 to the preemption delay of zero.

In both cases, the preemption delay value PRDV is inserted in step S2 into the header of the high-priority express packet, e.g. after the preamble and the delimiter (SMD-E) as also illustrated in FIG. 10. The high-priority express packets and the low-priority best-effort packets can be marked accordingly at the transmitter side TX.

On the receiver side RX, the packets received by the receiver 3 from the transmitter 2 via the signal line 4 are split automatically according to their marking into high-priority express packets and into low-priority best-effort packets before extracting the preemption delay value PRDV of the delay header field of the header of the received high-priority express packet in step S3.

In a further step S4, at the receiver RX, a variation compensation delay value VCD is calculated by subtracting the extracted preemption delay value PRDV from a predetermined worst-case preemption delay value $PRDV_{worst}$, e.g. 142 bytes (maximum preemption delay).

In a further step S5, at the receiver side RX, an additional delay is applied to the high-priority express packets according to the calculated variation compensation delay VCD value to compensate the preemption delay PD introduced by the preemption mechanism at the transmitter side TX.

Any other PDV occurred during transmission, e.g. one introduced by the MAC implementation itself or by transceivers and backpressures of incoming packets, can be as well corrected by extending the TX buffer (FIFO) capacity as well as the dynamic delay capacity.

The method according to the present invention eliminates, e.g. reduces to logic zero, the packet delay variation PDV introduced by implementing IEEE 802.1Qbu and IEEE 802.3br standards for Ethernet transmission. IEEE 802.1Qbu describes a frame preemption mechanism which minimizes the delay on express traffic and mixed with best-effort (preemptable) traffic within the same Ethernet port. IEEE 802.3br provides a specification of parameters for interspersing express traffic, i.e. a hardware implementation.

Figure 11:
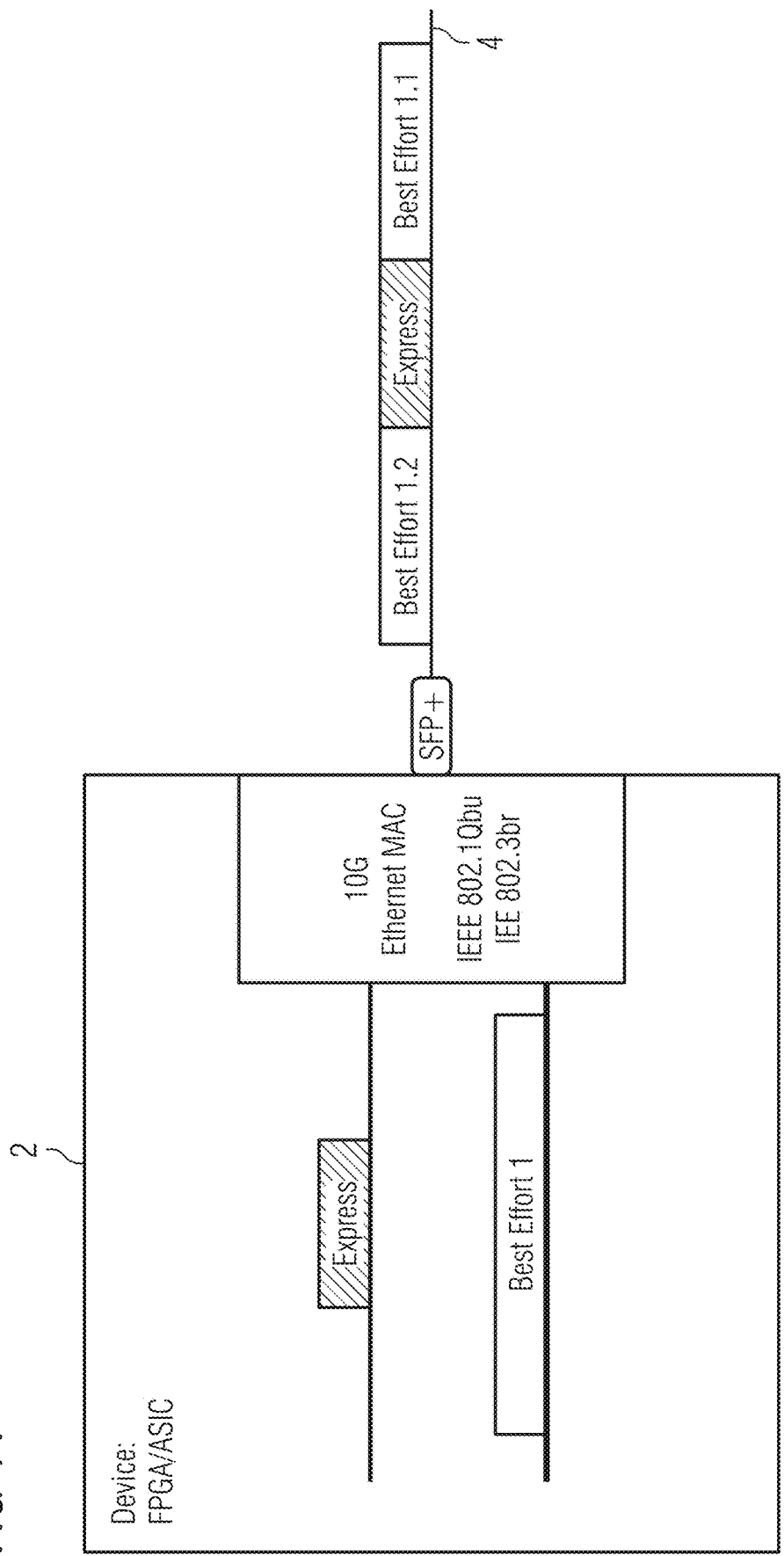
FIG. 11 shows a diagram for illustrating a frame preemption mechanism as used in the system according to the present invention.

FIG. 11 illustrates schematically frame preemption for interspersed express traffic in a transmitter device 2. As can be seen in FIG. 11, high-priority express traffic can be interspersed into low-priority best-effort traffic.

According to IEEE 802.1Qbu and IEEE 802.br, preemption is only possible if at least 60 bytes of the preemptable frame have been transmitted and at least 64 bytes remain to be transmitted.

FIGS. 12 to 16 illustrate five different scenarios which may occur during a preemption procedure.

Figure 12:
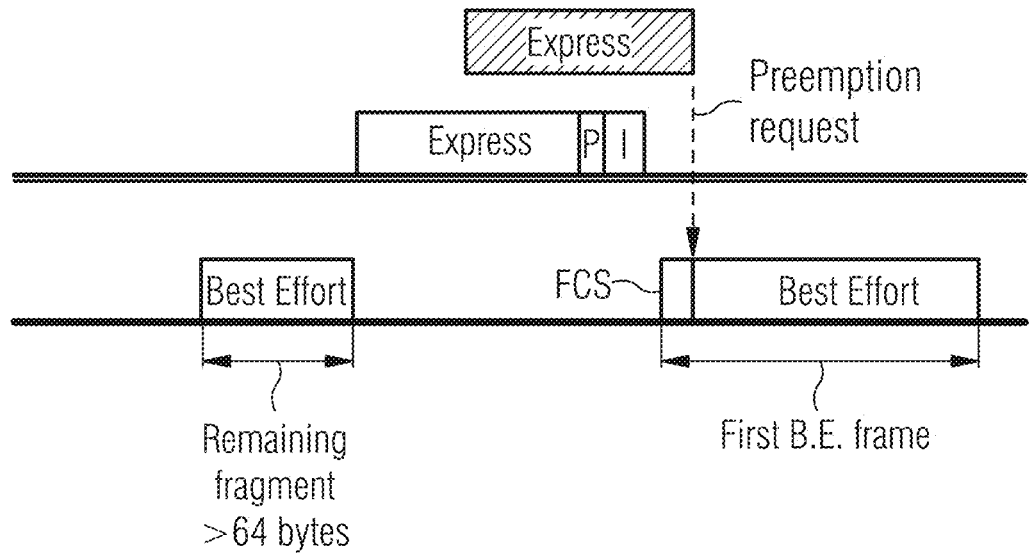
FIGS. 12-16 illustrate different possible traffic scenarios.

FIG. 12 shows a first scenario where a preemption request occurs in the middle.

In this case, preemption is possible and does occur without waiting if the remaining fragment comprises more than 64 bytes.

The introduced preemption delay comprises the interframe gap IFG+the preamble+FC=24 bytes in the illustrated example. Consequently, the variation compensation delay value VCD=142−24=118 bytes in the illustrated example of FIG. 12.

Figure 13:
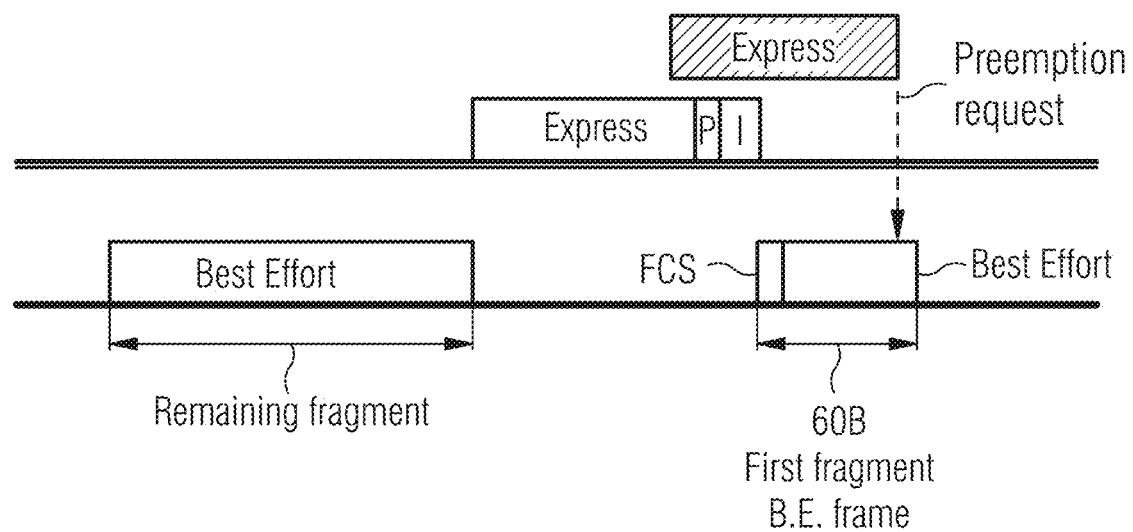

FIG. 13 illustrates a second scenario where the preemption request occurs at the beginning.

A first fragment of the packet has to be at least 60 bytes in order to preempt the traffic.

The preemption delay comprises the interframe gap IFG+the preamble+FCS+(<60 bytes).

In the illustrated example, the VCD is 142−(IFG+preamble+FCS+(<60 bytes)).

Figure 14:
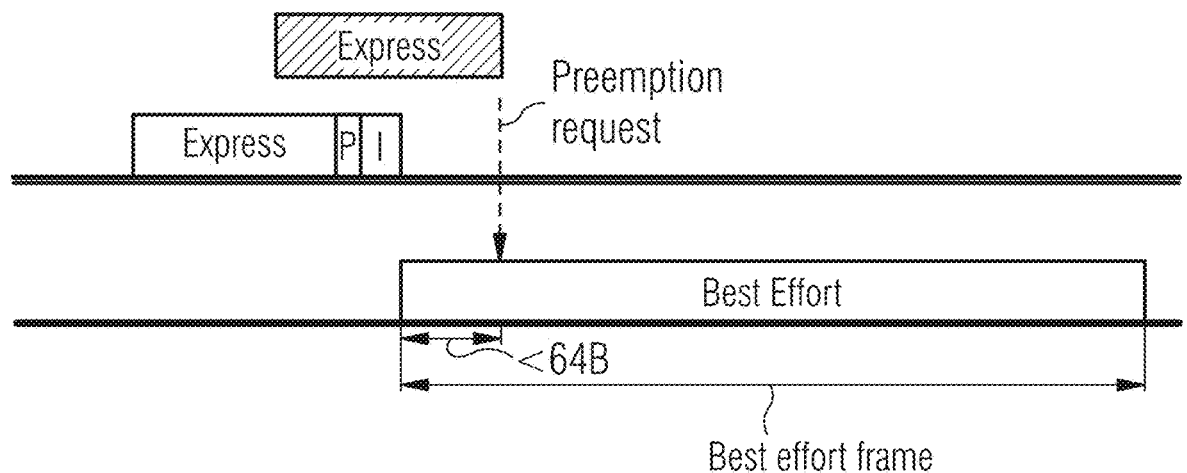

FIG. 14 shows a third scenario where a preemption request is too late, if the remaining fragment is smaller than 64 bytes.

The minimum remaining fragment has to be at least 64 bytes in order to be preempted.

In the illustrated third scenario, the preemption delay PD is the interframe gap IFG+preamble+(<64 bytes).

Consequently, the VCD=142−(IFG+preamble+(<64 bytes)).

Figure 15:
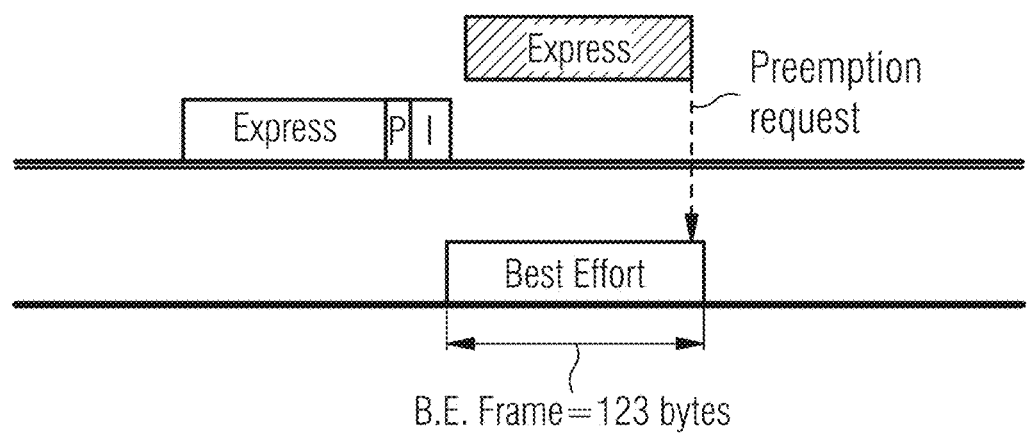

FIG. 15 shows a fourth scenario where the preemption is not possible if the total frame size is smaller than 124 bytes.

If the total frame size is smaller than 124 bytes a packet cannot preempted.

The preemption delay PD is the interframe gap IFG+preamble+(<124 bytes).

The *VCD*=142−(*IFG*+preamble+(<124 bytes)).

Figure 16:
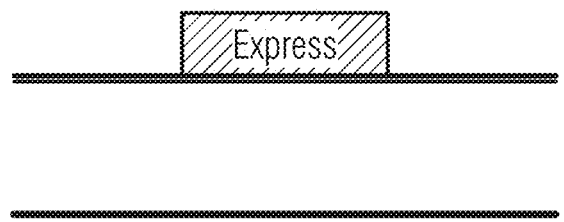

FIG. 16 shows a fifth scenario where there is only express traffic and no best-effort traffic.

Since there is no best-effort traffic, there is also no preemption. In this case, the preemption delay PD comprises 0 bytes and the variation compensation delay VCD comprises 142 bytes.

Figure 17:
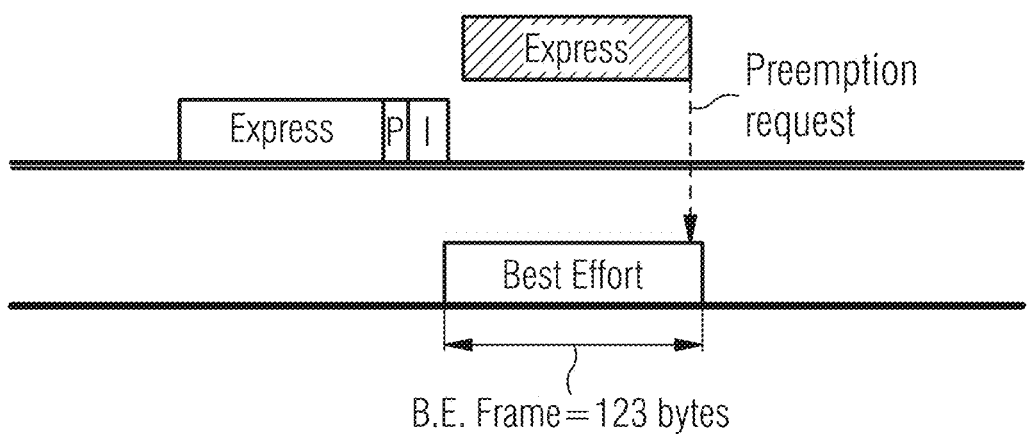
FIG. 17 illustrates a worst-case preemption delay which can be caused by a preemption mechanism in the system according to the present invention.

FIG. 17 illustrates a worst case where preemption is not possible if the total frame size is smaller than 124 bytes. In this case, the delay comprises 142 bytes. In the illustrated example, the preemption delay comprises the interframe gap IFG (12 bytes)+preamble (8 bytes)+122 bytes=142 bytes. Consequently, the maximum packet delay variation comprises 142 bytes (of transmission time) as evident from FIGS. 16, 17.

In a possible implementation, a 1-byte preemption delay header is defined to configure the on-the-fly configurable dynamic delay unit 2C on the receiver side.

Figure 18:
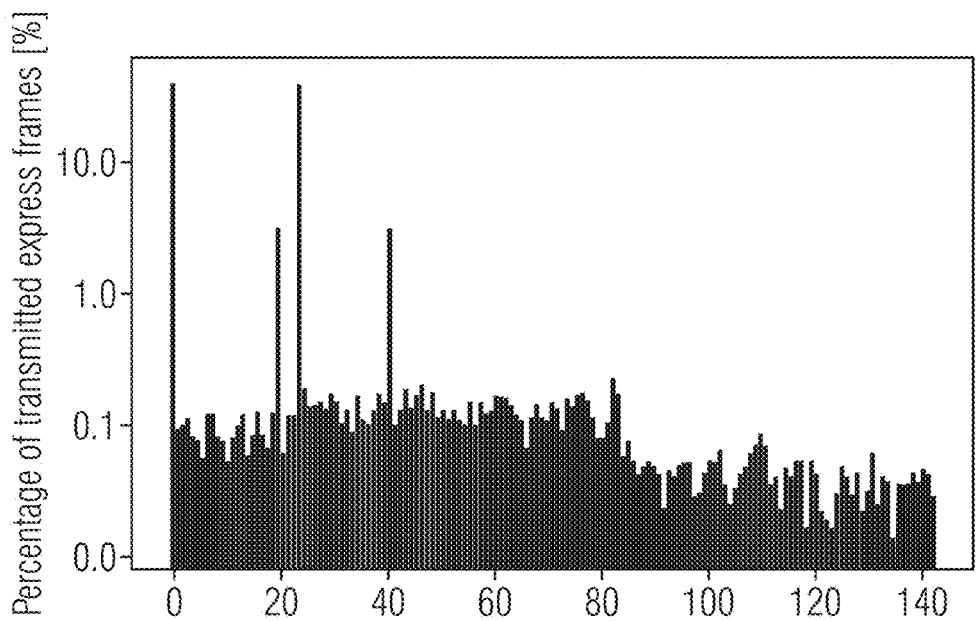
FIGS. 18, 19 show diagrams for illustrating simulation results in a system according to the present invention.
Figure 19:
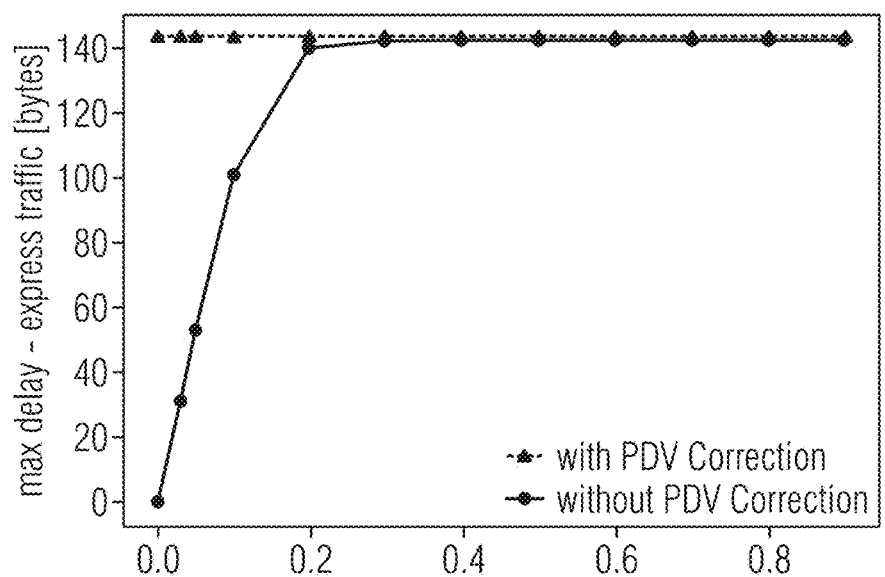

FIGS. 18, 19 illustrate simulation results. FIG. 18 illustrates logarithmically the simulation of the preemption delay behavior by running a FPGA hardware-based simulation using a linear feedback shift register LFSR algorithm to generate random packet length and packet gap sizes for both best-effort and express traffic. The simulation results confirm the calculated maximum PDV of 142 bytes transmission time. As can be seen, about 38% of the time preemption is not required so preemption delay is zero, whereas about 42% of the time, the preemption has been requested and performed so that the best traffic was interrupted which introduces a delay of 24 bytes consisting of a best effort fragment CRC check sum, the interframe gap IFG, preamble and delimiter. The rest of less than 20% of the time, a preemption delay PD of up to 142 bytes has been encountered.

FIG. 19 shows a maximum delay for express packets when express traffic constantly takes 50% of the total throughput and the relative low-priority best-effort traffic is varied from 0 to 0.9 to the express traffic load. It can be observed from FIG. 19 that increasing the percentage of best-effort traffic does increase the probability to reach a maximum preemption delay for the express traffic. Using PDV correction, with the method according to the present invention, synchronization-critical delay variation can be eliminated by introducing through compensation a small end-to-end fixed delay upper bounded to the maximum preemption delay.

The transmission system 1 according to the present invention can be used in a possible embodiment for transporting packets between remote radio heads RRH on the transmission side and a baseband unit BBU on the receiving side.

The method according to the present invention can be used for correcting at a destination node a packet delay variation PDV of interspersed express traffic with frame preemption. At a source node, it is possible to obtain frame data. At the source node, a non-preemptable high-priority express frame can be transmitted and encapsulated by defining a header field adapted to encode whether the transmission of the non-preemptable high-priority express frame data has been delayed or not by further inserting an additional 1-byte header field containing a preemption delay value PRDV to further indicate the value in bytes of the preemption delay PD introduced by the preemption mechanism.

Also, at the receiving node, frame data can be obtained. At the receiving node, interspersed express traffic can be identified by means of the encoded header field. Further, at the node, an additional variable delay is calculated from the received and extracted preemption delay value PRDV. The extracted preemption delay value is then added to compensate the packet delay variation PDV introduced by the preemption mechanism to achieve zero PDV.

The transmission system 1 according to the present invention requires only few additional FPGA/ASIC resources in terms of gates and flip-flops. The express packet size does not impact the FPGA or ASIC resource utilization because only the worst preemption delay value $PRDV_{worst}$ (in bytes) has to be stored in the FIFO buffer.

The method according to the present invention stays untouched for any packet size. The method according to the present invention provides for a lower fixed delay. A lower fixed delay provided by the present invention allows for more network hubs and for more time left for further packet processing implementations. A possible target system for the method according to the present invention is a point-to-point or linear add-drop system to aggregate time-sensitive fronthaul and backhaul 5G traffic. As any additional Ethernet switch will introduce additional delay and PDV, it can be assumed that all nodes on the transmission system 1 must be capable of supporting Ethernet TSN. In a use case where zero PDV has to be achieved, in a preferred embodiment, all Ethernet nodes in the transmission system 1 can be capable of supporting the method according to the present invention.

The invention claimed is:

1. A method of correcting a packet delay variation, PDV, of express traffic comprising high-priority express packets interspersed at a transmitter by a preemption mechanism with a best-effort traffic comprising low-priority best-effort packets,
wherein the method comprises the steps of:
calculating at the transmitter a preemption delay value, PRDV, which indicates a preemption delay, PD, introduced by the preemption mechanism;
writing the calculated preemption delay value, PRDV, into a delay header field of a header of a high-priority express packet transmitted by said transmitter via a signal line to a receiver;
extracting the preemption delay value, PRDV, from the delay header field of the header of the high-priority express packet received by the receiver via the signal line from the transmitter;
calculating at the receiver a variation compensation delay, VCD, value by subtracting the extracted preemption delay value, PRDV, from a predetermined worst-case preemption delay value, PRDVworst; and
applying at the receiver an additional delay to the high-priority express packet according to the calculated variation compensation delay, VCD, value to compensate the preemption delay, PD, introduced by the preemption mechanism at the transmitter.

2. The method according to claim 1, wherein the preemption mechanism at the transmitter interrupts the transmission of low-priority best effort packets in response to a preemption request if a high-priority express packet is provided by an express traffic source to preempt the low-priority best effort packets by the high-priority express packet.

3. The method according to claim 2, wherein the preemption of a low-priority best effort packet by the high-priority express packet is only performed in the preemption mechanism if at least a predefined first number of bytes of the preemptable best effort packet have been transmitted and at least a predefined second number of bytes of the preemptable best effort packet remains to be transmitted and/or a total frame size of the preemptable best effort packet is less than the sum of the first and second number of bytes.

4. The method according to claim 3, wherein the first number of bytes comprises 60 bytes and the second number of bytes comprises 64 bytes and wherein the sum of the first and second number of bytes comprises 124 bytes.

5. The method according to claim 4, wherein if no preemption can be performed the high-priority express packets are buffered in a FIFO (first in-first out) buffer unit of the transmitter before being interspersed by the preemption mechanism with low-priority best effort packets.

6. The method according to claim 5, wherein the size of the FIFO buffer unit of the transmitter corresponds to the worst-case preemption delay or bigger.

7. The method according to claim 1, wherein the predetermined worst-case preemption delay includes a mandatory interframe gap, IFG, a preamble and a delimiter.

8. The method according to claim 7, wherein the predetermined worst-case preemption delay comprises 142 bytes.

9. The method according to claim 1, wherein the high-priority express packets and the low-priority best effort packets are marked accordingly at the transmitter.

10. The method according to claim 9, wherein the packets received by the receiver from the transmitter via the signal line are split by the receiver according to their marking into high-priority express packets and into low-priority best effort packets before extracting the preemption delay value, PRDV, from the delay header field of the header of the high-priority express packet.

11. The method according to claim 1, wherein the preemption mechanism comprises an IEEE 802.Qbu preemption mechanism or an IEEE 802.3br preemption mechanism.

12. The method according to claim 1, wherein the high-priority express packets comprise time-sensitive Ethernet frames.

13. A transmitter for transmitting traffic which includes express traffic comprising high-priority express packets interspersed at the transmitter by a preemption mechanism with a best effort traffic comprising low-priority best effort packets,
said transmitter comprising:
a processing unit adapted to calculate a preemption delay value, PRDV, which indicates a preemption delay, PD, introduced by the preemption mechanism; and
an insertion unit implemented within a medium access control (MAC) merge sublayer of a MAC transmit (TX) component of a field programmable gate array (FPGA) or application specific integrated circuit (ASIC), wherein the insertion unit writes the calculated preemption delay value, PRDV, into a newly created delay header field of a header of a high-priority packet transmitted by said transmitter via a signal line to a receiver.

14. The transmitter according to claim 13 further comprising a FIFO buffer unit, adapted to buffer high-priority express packets before being interspersed by the preemption mechanism of the transmitter.

15. A receiver for receiving traffic which includes express traffic comprising high-priority express packets interspersed at a transmitter by a preemption mechanism with best effort traffic comprising low-priority best effort packets,
said receiver comprising:
an extraction unit implemented within a medium access control (MAC) merge sublayer of a receive (RX) component of a field programmable gate array (FPGA) or application specific integrated circuit (ASIC), wherein the extraction unit extracts a preemption delay value, PRDV, from a delay header field of a header of a high-priority express packet received by the receiver via a signal line from the transmitter;
a processing unit, adapted to calculate a variation compensation delay, VCD, value by subtracting the extracted preemption delay value, PRDV, from a predetermined worst-case preemption delay value, PRDVworst; and
a dynamic delay unit, adapted to apply an additional delay to the high-priority express packet according to the calculated variation compensation delay, VCD, value to compensate the preemption delay, PD, introduced by the preemption mechanism at the transmitter.

16. The receiver according to claim 15, wherein the dynamic delay unit of the receiver comprises serial connected delay registers having outputs connected with inputs of a multiplexer (MUX) receiving as a selection control signal the variation compensation delay, VCD, value calculated by the processing unit of the receiver.

17. The receiver according to claim 16, further comprising a splitting unit, adapted to split packets received via the signal line from the transmitter according to their marking into high-priority express packets and into low-priority best effort packets before extracting the preemption delay value, PRDV, from the delay header field of the header of the high-priority express packet by the extraction unit of the receiver.

18. A transmission system comprising at least one transmitter for transmitting traffic which includes express traffic comprising high-priority express packets interspersed at the transmitter by a preemption mechanism with a best effort traffic comprising low-priority best effort packets,
  said transmitter comprising:
    a processing unit adapted to calculate a preemption delay value, PRDV, which indicates a preemption delay, PD, introduced by the preemption mechanism; and
    an insertion unit implemented within a medium access control (MAC) merge sublayer of a MAC transmit (TX) component of a field programmable gate array (FPGA) or application specific integrated circuit (ASIC), wherein the insertion unit writes the calculated preemption delay value, PRDV, into a newly created delay header field of a header of a high-priority packet transmitted by said transmitter via a signal line to a receiver;
  said receiver comprising:
    an extraction unit is implemented within the MAC merge sublayer of a MAC receive (RX) component of the FPGA or ASIC, wherein the extraction unit extracts a preemption delay value, PRDV, from a delay header field of a header of a high-priority express packet received by the receiver via a signal line from the transmitter;
    a processing unit, adapted to calculate a variation compensation delay, VCD, value by subtracting the extracted preemption delay value, PRDV, from a predetermined worst-case preemption delay value, PRDVworst; and
    a dynamic delay unit, adapted to apply an additional delay to the high-priority express packet according to the calculated variation compensation delay, VCD, value to compensate the preemption delay, PD, introduced by the preemption mechanism at the transmitter;
  wherein the transmitter and the receiver are connected to each other via a signal line of the transmission system.

* * * * *